United States Patent
Tieke et al.

(10) Patent No.: US 7,573,802 B2
(45) Date of Patent: Aug. 11, 2009

(54) WRITE-ONCE OPTICAL DATA STORAGE MEDIUM HAVING DUAL RECORDING LAYERS

(75) Inventors: Benno Tieke, Eindhoven (NL); Hubert Cécile François Martens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 931 days.

(21) Appl. No.: 10/501,429

(22) PCT Filed: Jan. 16, 2003

(86) PCT No.: PCT/IB03/00090

§ 371 (c)(1),
(2), (4) Date: Jul. 13, 2004

(87) PCT Pub. No.: WO03/060895

PCT Pub. Date: Jul. 24, 2003

(65) Prior Publication Data

US 2005/0042545 A1    Feb. 24, 2005

(30) Foreign Application Priority Data

Jan. 18, 2002   (EP)   .................... 02075226

(51) Int. Cl.
*G11B 7/24*   (2006.01)
(52) U.S. Cl. .................................... 369/275.1
(58) Field of Classification Search ............... 369/13.4, 369/13.38, 275.1–275.5, 283; 430/270.11, 430/270.13
See application file for complete search history.

(56) References Cited

U.S. PATENT DOCUMENTS

| | | | |
|---|---|---|---|
| 5,627,817 A * | 5/1997 | Rosen et al. ................. 369/100 |
| 5,846,627 A | 12/1998 | Hong | |
| 6,226,239 B1 | 5/2001 | Nishiuchi et al. | |
| 6,511,788 B1 * | 1/2003 | Yasuda et al. .......... 430/270.13 |
| 2001/0005350 A1 * | 6/2001 | Kitaura et al. ................. 369/94 |
| 2003/0185143 A1 * | 10/2003 | Lin et al. .................. 369/275.4 |
| 2006/0063108 A1 * | 3/2006 | Van Schijndel et al. 430/270.14 |
| 2006/0240357 A1 * | 10/2006 | Martens et al. ......... 430/270.11 |
| 2007/0121478 A1 * | 5/2007 | Martens et al. .......... 369/275.1 |

FOREIGN PATENT DOCUMENTS

EP   1118987 A1   7/2001
JP   11066622 A   9/1999

* cited by examiner

*Primary Examiner*—Tan X Dinh

(57) ABSTRACT

A dual-stack optical data storage medium for write-once recording using a focused radiation beam entering through an entrance face of the medium is described. The medium includes at least one substrate with present on a side thereof a first recording stack $L_0$ having a write-once type $L_0$ recording layer with an absorption $k_{L0}$ and a second recording stack $L_1$ including a write-once type $L_1$ recording layer with an absorption $k_{L1}$. The first recording stack $L_0$ has an optical reflection value $R_{L0}$ and an optical transmission value $T_{L0}$ and the second recording stack has an optical reflection value $R_{L1}$. The first recording stack is present at a position closer to the entrance face than the second recording stacks When the following conditions are fulfilled: $0.45 \leq T_{L0} \leq 0.75$ and $0.40 \leq R_{L1} \leq 0.80$ and $k_{L0} < 0.3$ and $k_{L1} < 0.3$ a dual stack write-once medium is achieved which can be played in a standard DVD-ROM player.

20 Claims, 11 Drawing Sheets

WRITE-ONCE OPTICAL DATA STORAGE MEDIUM HAVING DUAL RECORDING LAYERS

The invention relates to a dual-stack optical data storage medium for write-once recording using a focused radiation beam having a wavelength λ and entering through an entrance face of the medium during recording, comprising:

at least one substrate with present on a side thereof:

a first recording stack named $L_0$, comprising a write-once type $L_0$ recording layer having a complex refractive index $\tilde{n}_{L0}=n_{L0}-i.k_{L0}$ and having a thickness $d_{L0}$, said first recording stack L0 having an optical reflection value $R_{L0}$ and an optical transmission value $T_{L0}$, a second recording stack named $L_1$ comprising a write-once type $L_1$ recording layer having a complex refractive index $\tilde{n}_{L1}=n_{L1}-i.k_{L1}$ and having a thickness $d_{L1}$, said second recording stack $L_1$ having an optical reflection value $R_{L1}$, all parameters defined at the wavelength λ, said first recording stack being present at a position closer to the entrance face than the second recording stack, a transparent spacer layer sandwiched between the recording stacks, said transparent spacer layer having a thickness substantially larger than the depth of focus of the focused radiation beam.

An embodiment of an optical recording medium as described in the opening paragraph is known from Japanese Patent Application JP-11066622.

Recently the Digital Versatile Disk (DVD) has gained market share as a medium with a much higher data storage capacity than the CD. Presently, this format is available in a read only (ROM), recordable (R) and a rewritable (RW) version. For recordable and rewritable DVD, there are at present several competing formats: DVD+R, DVD-R for recordable and DVD+RW, DVD-RW, DVD-RAM for rewritable. An issue for both the recordable and rewritable DVD formats is the limited capacity and therefore recording time because only single-stacked media are present with a maximum capacity of 4.7 GB. Note that for DVD-Video, which is a ROM disk, dual layer media with 8.5 GB capacity, often referred to as DVD-9, already have a considerable market share. Consequently, recordable and rewritable DVD's with 8.5 GB capacity are highly desired. A dual-layer, i.e. dual-stack, rewritable DVD disk is probably feasible. However, it has become clear that a rewritable fully compatible disk, i.e. within the reflection and modulation specification of the dual-layer DVD-ROM, is very difficult to achieve and requires at least a major breakthrough for the properties of the amorphous/crystalline phase-change materials, which are used as recording layers in rewritable DVD media. Typical achievable effective reflection levels are about 7%; such low reflection values severely reduce read-back compatibility on existing DVD-players. Without a full compatibility, the success of a dual-layer rewritable DVD in the market is questionable.

In order to obtain a dual-stack recordable DVD medium which is compatible with the dual-layer (=dual-stack) DVD-ROM standard, the effective reflectivity of both the upper $L_0$ layer and the lower $L_1$ layer should be at least 18%, i.e. the minimum effective optical reflection level in order to meet the specification is $R_{min}=0.18$. Effective optical reflection means that the reflection is measured as the portion of effective light coming back from the medium when e.g. both stacks $L_0$ and $L_1$ are present and focusing on $L_0$ and $L_1$ respectively. The minimum reflection $R_{min}=0.18$ is a requirement of the DVD-standard. However, in practice also a somewhat lower effective reflection, e.g. R>0.12, is acceptable to achieve read-out compatibility in existing DVD-players. Note that such a reflectivity of R>0.12 is, at present, not achievable in a rewritable dual-stack DVD based on e.g. phase-change technology.

The conditions, which must be imposed on the optical reflection, absorption and transmission values of the stacks in order to meet such a specification are by far not trivial. In JP-11066622 nothing is mentioned about requirements with respect to optical reflection, absorption and transmission values of the stacks and how to achieve these. It should be noted that in this document $L_0$ is defined as the "closest" stack, i.e. closest to the radiation beam entrance face, and $L_1$ is the deepest stack, as seen from the radiation beam entrance face.

It is an object of the invention to provide a dual stack optical data storage medium of the type mentioned in the opening paragraph which has effective reflection values which provide at least read-out compatibility with existing DVD-ROM players. In an optimized form compatibility may be achieved with the existing DVD-ROM standard.

This object is achieved with the optical data storage medium according to the invention which is characterized in that $0.45 \leq T_{L0} \leq 0.75$ and $0.40 \leq R_{L1} \leq 0.80$ and $k_{L0}<0.3$ and $k_{L1}<0.3$. The applicant has found that these requirements may be deduced from the requirement that the effective reflection levels from both recording stacks $L_0$ and $L_1$ are larger than 12%. More preferably $0.55 \leq T_{L0} \leq 0.65$ and $0.50 \leq R_{L1} < 0.70$ and $k_{L0}<0.2$ and $k_{L1}<0.2$ in which case even higher effective reflection values may be achieved e.g. 15% or 18%. A dual-stack recordable DVD medium (e.g. DVD+R) based on a recording layer with write once technology, having a relatively low optical absorption can in principle overcome the reflection-problem of the phase-change rewritable DVD dual stack medium. A write-once recording layer with a relatively low absorption is e.g. a dye layer. The present invention can be applied to both the DVD+R and DVD-R formats. In the following, we will use DVD+R to indicate a recordable DVD in general.

The typical single stack DVD+R medium has a reflectivity of 50% and a modulation of 600%; these values are within the single stack DVD-ROM specification; DVD+RW media have much lower reflectivity of about 20%. The starting point for developing a dual-stack R-medium is thus much more favorable than for RW media. The dye material intrinsically has a high transmission at the wavelength λ. In combination with a metal reflective layer, a high reflectivity can be achieved. Thus, recording is possible with a relatively low absorption in the dye layer. Typical dyes that can be used are cyanine-type, azo-type, squarylium-type, or other organic dye material having the desired properties.

The minimum effective reflection of both layers is 12%, typical stack designs in this invention are targeted for at least $R_{eff}=18\%$. FIG. 1 shows that a compatible dual stack DVD+R medium is in principle possible when assuming reasonable numbers for transmission and absorption of recording, e.g. dye, stacks. A reflection of larger than 18% per stack is possible if the transmission of the upper recording stack $L_0$ is between 45% and 75%; the intrinsic reflection of the lower recording stack $L_1$ should then be in the range 40%-80%. FIG. 1b illustrates this fact in more detail.

In the DVD embodiment λ is approximately 655 nm. FIG. 4a shows the calculated reflectivity for a recording layer-only stack as a function of the $L_0$ recording layer thickness $d_{L0}$. For common values of the recording layer's optical constants ($n_{L0}<3$, $k_{L0}<0.3$) a sufficiently high transmission can be achieved; the reflectivity therefore determines the required optical parameters and layer thickness. Preferably $n_{L0} \leq 2.5$ and $d_{L0}$ is in the range of $\lambda/8n_{L0} \leq d_{L0} \leq 3)\lambda/8n_{L0}$ or $5\lambda/8n_{L0} \leq d_{L0} \leq 7\lambda/8n_{L0}$. FIG. 4b shows the calculated maximum reflectivity of a $L_0$ recording layer-only stack as a function of the real part of the refractive index $n_{L0}$ of the recording layer; the dashed horizontal line indicates a reflection level R=18%. It follows from FIG. 4b that in order to get a reflectivity of at least 18%, the recording layer's refractive index $n_{L0}$ should be sufficiently large (or small):

$$n_{L0} \geq 2.5 \text{ or } n_{L0} \leq 1.0$$

The latter is however less likely to be met in practice.

The optimal $L_0$ recording layer thickness $d_{L0}$ is at the first or second maximum in reflectivity, the preferred layer thickness is then:

$$\lambda/8n_{L0} \leq d_{L0} \leq 3\lambda/8n_{L0}$$

$$5\lambda/8n_{L0} \leq d_{L0} \leq 7\lambda/8n_{L0} \quad (2^{nd}\text{max})$$

The advantages of this $L_0$ stack design are a high transparency and its simplicity.

In another embodiment a first metal reflective layer, having a thickness $d_{M1} \leq 25$ nm, is present between the write-once $L_0$ recording layer and the transparent spacer layer and $d_{L0}$ is in the range of $\lambda/8n_{L0} \leq d_{L0} \leq 5\lambda/8n_{L0}$. For this stack, a relatively thin first metal reflective layer is placed between the dye and the spacer. The first metal reflective layer serves as a semi-transparent layer to increase the reflectivity. A maximum thickness and suitable material must be specified to keep the transmission of the first metal reflective layer sufficiently high. For the metal layer e.g. Ag, Au, Cu, Al, or alloys thereof, or doped with other elements, can be used. In order to obtain a sufficiently transparent stack ($T_{L0} \geq 45\%$), the preferred thickness of the metal layer is:

$$d_{M1} \leq 25 \text{ nm}$$

The optimum dye-layer thickness is determined by both the maxima in transmission and reflection.

The presence of the thin metal layer introduces an additional phase shift $\Delta \sim 1/8$ to $1/4$ in the extrema of R and T; for this stack design the maxima in R and T are located at: Max(R) $\rightarrow \lambda/2n_{L0}(p-\Delta)$, Max(T) $\rightarrow \lambda/2n_{L0}(p+1/2-\Delta)$.

Only the thickness range around the first reflection maximum is suitable because of the decreasing transmission for larger dye thickness. The lower limit (LL) for $d_{L0}$ is defined by the maximum in T: LL=Max(R)$-1/2$ period=$\lambda/8n_{L0}$. The upper limit for d is defined by 2nd Max(T)$-1/8$ period=Max (R)$+3/8$ period=$5\lambda/8n_{L0}$ because for thickness the reflectivity drops strongly. Thus, the preferred dye layer thickness range becomes:

$$\lambda/8n_{L0} \leq d_{L0} \leq 5\lambda/8n_{L0}.$$

The advantages of the described design are the good reflective properties and the nearly similar stack design, and thus nearly similar fabrication process, as "standard" single recording stack medium.

In another embodiment a first transparent auxiliary layer I1, having a refractive index $n_{I1} \geq 1.8$ and having a thickness $d_{I1} \leq \lambda 2n_{I1}$, is present between the first metal reflective layer and the transparent spacer layer. By adding a first transparent auxiliary layer I1, e.g. a dielectric interference layer, adjacent the first metal reflective layer the transmission near the optimum reflectivity is increased; the role of the dielectric I-layer is to counteract the optical mismatch between the "recording layer+thin metal" stack and the substrate, e.g. made of polycarbonate, and thereby lower the reflection and raise the transmission.

Clearly, with three layers many combinations are possible. However, the only useful stack design is recording layer/thin-metal/I-layer, which can have high T, finite R, and sufficient absorption in the recording layer at the same time. For this stack type, for the first metal reflective layer e.g. Ag, Au, Cu, Al or alloys thereof, or doped with other elements, can be used. In order to obtain a sufficiently transparent stack, the preferred thickness of the metal layer for this stack type is:

$$d_{M1} \leq 25 \text{ nm}$$

As shown in FIGS. 10a-10b, the first auxiliary layer I1 below the first metal reflective layer indeed increases the stack's transmission and decreases its reflectivity, while the position of the R- and T-extrema stays (nearly) the same. The optimum recording layer thickness is determined by the first maximum in reflection, which is given by Max(R)$\rightarrow \lambda/2n_{L0}$ (1$-\Delta$), where $\Delta \sim 1/8$ to $1/4$ is a phase shift introduced by the metal. The preferred recording layer thickness for this stack becomes:

$$\lambda/8n_{L0} \leq d_{L0} \leq 5\lambda/8n_{L0}$$

It is preferred that $d_{I1} \leq \lambda/4n_{I1}$. It appears that the relative increase in T that can be gained by the first auxiliary I1-layer depends on the I1-layer's refractive index and on the metal reflective layer thickness, while the properties of the recording layer do not influence the relative increase of T. As shown in FIG. 11, the useful range of refractive indices $n_I$ of the I-layer is $$n_{I1} \geq 1.8$$

From FIG. 11 it can be derived what the minimal refractive index of the I1-layer is for which an increase by a factor X in transmission of the bare recording layer/thin-metal-reflective layer stack can be gained. It follows that for an X-gain in transmission the I-layer's refractive index should be:

$$n_{I1} \geq (X+0.036*d_{M1}-1.025)/(0.0267*d_{M1}+0.005)$$

Here, the first metal reflective layer thickness $d_{M1}$ is given in nanometers (note that the formula is an approximation in the range of $n_{I1}$ of 1.8-3). The X-factor can be calculated by dividing the required transmission of the stack (e.g. 50%) by the transmission of the bare (without I-layer) recording layer/thin-metal-reflective layer stack (e.g. 38%). For example, if a transmission increase by a factor 50/38=1.3 is required for the bare recording layer/thin-metal-reflective layer stack having a metal reflective layer of 15 nm thickness, the refractive index of the additional I1-layer should by at least 2.0.

The reflection and transmission of the stack are also periodic in the thickness of the lower-lying interference layer, with period $\lambda/2n_{I1}$. Therefore, the I1-layer thickness need not be larger than one period:

$$d_{I1} \leq \lambda/2n_{I1}$$

If the I1-layer is intended to increase T (and decrease R) it's optimal thickness lies at the position of the first maximum in T which is located at $(1/2-\Delta)*\lambda/2n_{I1}$, with $\Delta \sim 1/8$.

The preferred (optimal) thickness of the I-layer then becomes:

$$d_{I1,opt} = 3\lambda/16n_{I1}$$

For larger $d_{I1}$ the transmission decreases and the reflection increases again. If $n_{I1}$ is sufficiently large, it is possible to keep the I1-layer's thickness below the optimum value given above.

The useful thickness range of the I-layer then becomes:

$$d_{I1} \leq \lambda/4n_{I1}$$

The advantage of this design is its flexibility, i.e. a large range of R and T is possible.

In another embodiment a second transparent auxiliary layer I2, having a refractive index $n_{I2}$ and having a thickness $d_{I2}$ in the range of $0<d_{I2} \leq 3\lambda/8n_{I2}$, is present at a side of the write-once $L_0$ recording layer and $d_{L0}$ is in the range of $\lambda/8n_{L0} \leq d_{L0} \leq 3\lambda/8n_{L0}$ or $5\lambda/8n_{L0} \leq d_{L0} \leq 7\lambda/8n_{L0}$. Preferably the second transparent auxiliary layer is present at a side of the write-once $L_0$ recording layer most remote from the entrance face and $n_{I2} \leq n_{L0}/1.572$. Alternatively the second transparent auxiliary layer is present at a side of the write-once $L_0$ recording layer closest to the entrance face and $n_{I2} \geq n_{L0}/0.636$. No metal reflective layer is present. This stack is based on the principle of a dielectric mirror. Since the second auxiliary I2-layer, i.e. the dielectric mirror, is transparent, the requirements for recording- and I-layer thickness and optical constants follow from the reflectivity constraint.

The reflectivity is maximized when the interference layer is $\lambda/4n_{I2}$ (or $3\lambda/4n_{I2}$) thick and the dye layer $\lambda/4n_{L0}$ ($1^{st}$ max) or $3\lambda/4n_{L0}$ ($2^{nd}$ max).

The preferred range of the interference layer thickness is:

$$0<d_{I2} \leq 3\lambda/8n_{I2}$$

The preferred thickness range for the dye layer is:

$$\lambda/8n_{L0} \leq d_{L0} \leq 3\lambda/8n_{L0} \quad (1^{st}\text{max})$$

$$5\lambda/8n_{L0} \leq d_{L0} \leq 7\lambda/8n_{L0} \quad (2^{nd}\text{max})$$

Two cases of this type of stack can be discerned:
(a) recording layer on top of I2-layer and
(b) I2-layer on top of recording layer.

Case (a)

The optimum reflectivity is given by $R=[(1-(n_{L0}/n_{I2})^2)/(1+(n_{L0}/n_{I2})^2)]^2$.

To meet the reflectivity specification of R=18%, the I2-layer's refractive index can be calculated to be:

$$n_{I2} \leq n_{L0}/1.572$$

Case (b)

The optimum reflectivity is given by $R=[(1-(n_{I2}/n_{L0})^2)/(1+(n_{I2}/n_{L0})^2)]^2$.

To meet the reflectivity specification of R=18%, the I2-layer's refractive index can be calculated to be:

$$n_{I2} \geq n_{L0}/0.636$$

By adding more transparent auxiliary layers (with alternating high n and low n, and thickness around $\lambda/4n$) the reflective properties of the stack can be improved using less extreme values of the refractive indices of the I2-layers. However, the stack becomes more complicated then. The advantage of the design described above is its relative simplicity while still sufficient reflection and high transmission are achieved.

The stacks proposed for $L_0$ are not restricted to use in dual-stack media, but can be used in single-stack and multi-stack (>2) media as well.

For the $L_1$ stack of the dual-stack optical data storage medium according to the invention a second metal reflective layer is present at a side of the write-once type $L_1$ recording layer most remote from the entrance face. In another embodiment the second metal reflective layer has a thickness $d_{M2} \geq 25$ nm and preferably $d_{L1}$ is in the range of $0<d_{L1} \leq 3\lambda/4n_{L1}$. The latter range is the range of a conventional single stack write once medium. When $d_{M2}$ is lower than 25 nm the reflectivity may become too low. The lower $L_1$ stack of a recordable dual-stack DVD medium should have high reflectivity at the radiation beam wavelength in order to be able to read back recorded data through the above $L_0$ stack. To meet the DVD-ROM dual-layer (i.e. dual-stack) specifications the effective reflectivity of $L_1$ should be in the range of 18% to 30%. If the $L_0$ stack has a transmission at the laser wavelength of $T_{L1}$, this means that the intrinsic reflection of $L_1$ should be in the range $18/T_{L0}^2$% to $30/T_{L0}^2$%. Given typical transmission of $L_0$ in the range 50% to 60%, this impli $L_1$'s reflectivity should be 50% or more. This value already falls within the reflectivity-range specified for single-stack DVD+R discs. Thus in principle a single-stack DVD+R stack design can be used as the $L_1$-stack. However, in the case of type 2 (see FIG. 16b) discs, this implies that the recording layer, e.g. the dye is in direct contact with e.g. the adhesive for the spacer layer. This adhesive can possibly harm the dye, resulting in poor medium lifetimes.

It is therefore preferred that a third transparent auxiliary layer I3, having a refractive index $n_{I3}$ and having a thickness $d_{I3}$ in the range of $0<d_{I3} \leq \lambda/n_{I3}$, is present adjacent the write-once type $L_1$ recording layer at a side of the write-once type $L_1$ recording layer closest to the entrance face or that a third metal reflective layer, having a thickness $d_{M3}$ in the range of $0<d_{M3} \leq 25$ nm, is present adjacent the write-once $L_1$ recording layer at a side closest to the entrance face and $d_{L1}$ is in the range of $0<d_{L1} \leq 5\lambda/16n_{L1}$ or $7\lambda/16n_{L1} \leq d_{L1} \leq \lambda/n_{L1}$. By introducing the third transparent auxiliary layer or third metal reflective layer the problem of chemical influence of the spacer layer to the recording layer is counteracted. Two $L_1$ stack types are proposed here which protect the recording layer from e.g. the adhesive of the spacer layer. The stacks proposed here are not restricted to use in dual-stack optical recording media and can be applied in any (single-stack and multi-stack) organic-recording layer, e.g. dye, based optical recording medium. For the third metal reflective layer e.g. Ag, Au, Cu, Al or alloys thereof, or doped with other elements, can be used.

Schematic layout of this stack design is given in FIG. 14.

For the thin metal layer e.g. Ag, Au, Cu, Al or alloys thereof, or doped with other elements, can be used.

In an advantageous embodiment of the dual-stack optical data storage medium a fourth transparent auxiliary layer I4, having a refractive index $n_{I4}$ and having a thickness $d_{I4}$ in the range of $0<d_{I4} \leq 3\lambda/16n_{I4}$, is present between the write-once $L_1$ recording layer and the second metal reflective layer. This fourth transparent auxiliary layer allows a slightly thinner recording layer thickness, while the reflection and modulation of written marks remains good.

In yet another advantageous embodiment of the dual-stack optical data storage medium a fifth transparent auxiliary layer I5, having a refractive index $n_{I5}$ and having a thickness $d_{I5}$ in the range of $0<d_{I5} \leq \lambda/4n_{I5}$, is present adjacent the third metal reflective layer at a side of the third metal reflective layer closest to the entrance face. This fifth transparent auxiliary layer increases the chemical barrier between the recording layer and the spacer-layer adhesive that is beneficial for lifetime of the recording stack.

It may be advantageous when at least one of the transparent auxiliary layers comprises a transparent heatsink material selected from the group of materials ITO, HfN and AlON. Generally dielectric materials exhibit a poor heat conductivity. The mentioned materials have a relatively high heat conductivity while they are transparent. A high heat conductivity may increase the quality of recorded marks in terms of mark definition, e.g. jitter, shape, modulation In the dual stack optical data storage medium a guide groove for $L_1$ may be provided in the transparent spacer layer, called type 1, or in the substrate, called type 2. The guide groove is also called pregroove or servo groove. A guide groove for $L_0$ may be provided in the substrate closest to the entrance face.

The invention will be elucidated in greater detail with reference to the accompanying drawings, in which:

FIG. 10b shows the same for reflection as a function of the recording layer thickness for the stacks of FIG. 10a.

Figure 1A:
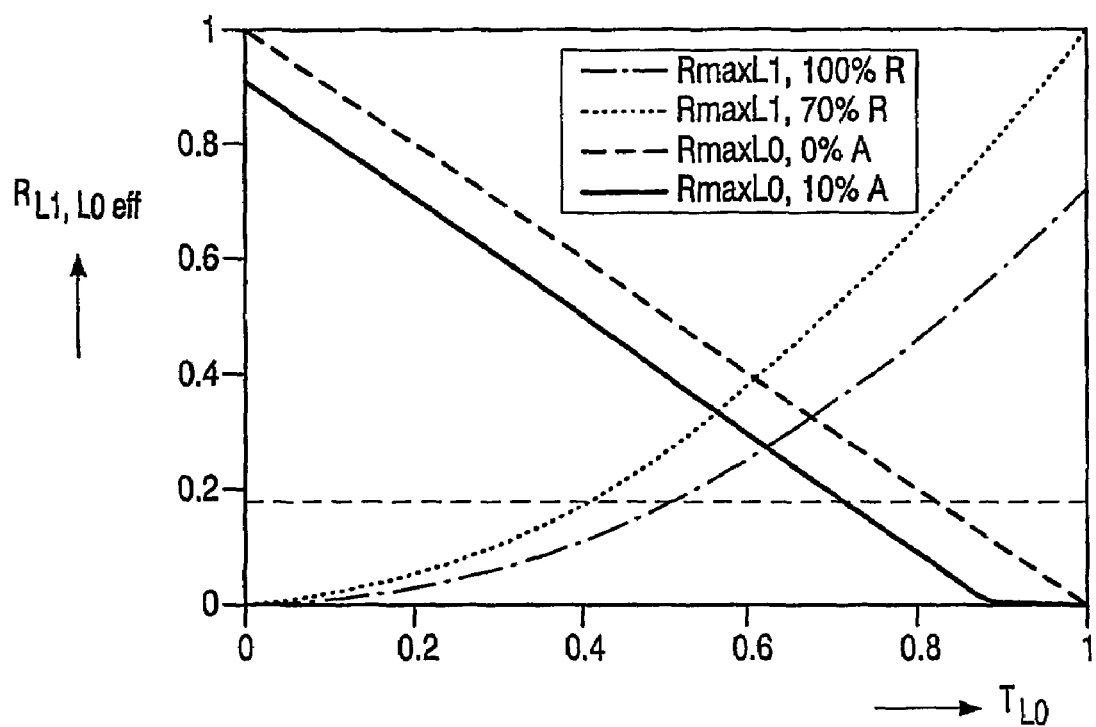
FIG. 1a shows the maximum attainable effective reflection of both the upper recording stack $L_0$ and the lower recording stack $L_1$ as a function of the transmission of upper recording stack $L_0$.

In FIG. 1a the maximum attainable reflection of the lower recording stack $L_1$ as a function of the transmission T of upper recording stack $L_0$ is shown. The lines for absorption A=0 are the theoretical limit, a typical absorption for e.g. a dye layer would be 10%. The effective reflection of 18% per stack as required by the DVD standard is indicated by the horizontal dashed line; in this invention $R_{eff} \geq 18\%$ is taken as a targeted value for the preferred embodiments.

Figure 1B:
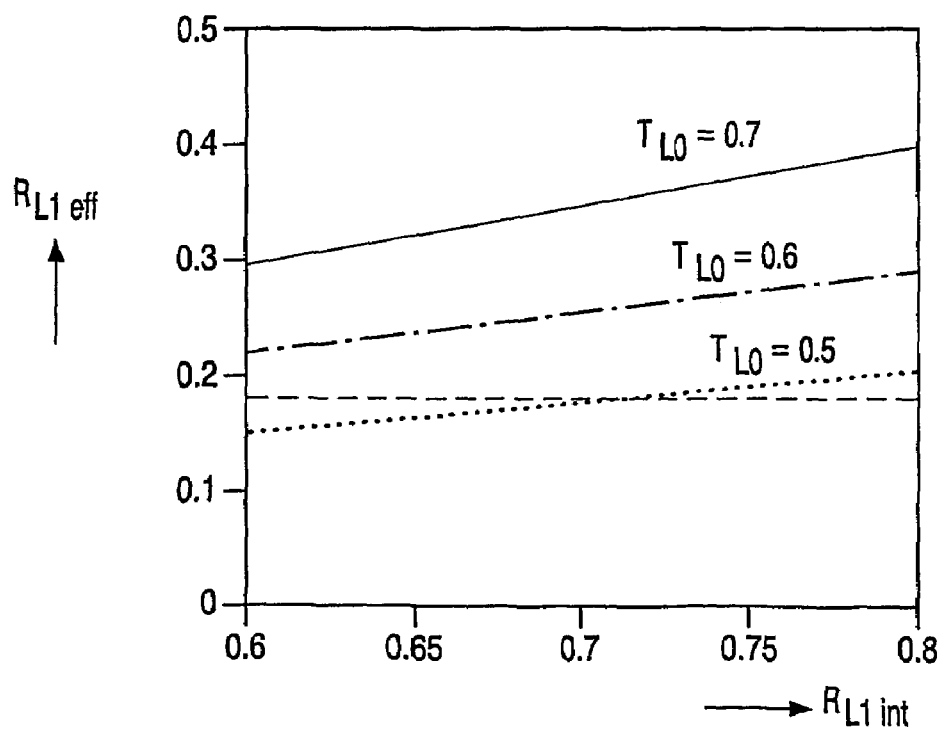
FIG. 1b shows the effective total reflection from the $L_1$ stack as a function of the intrinsic reflection of $L_1$; examples for three different Transmission values of $L_0$ are shown.
Figure 2:
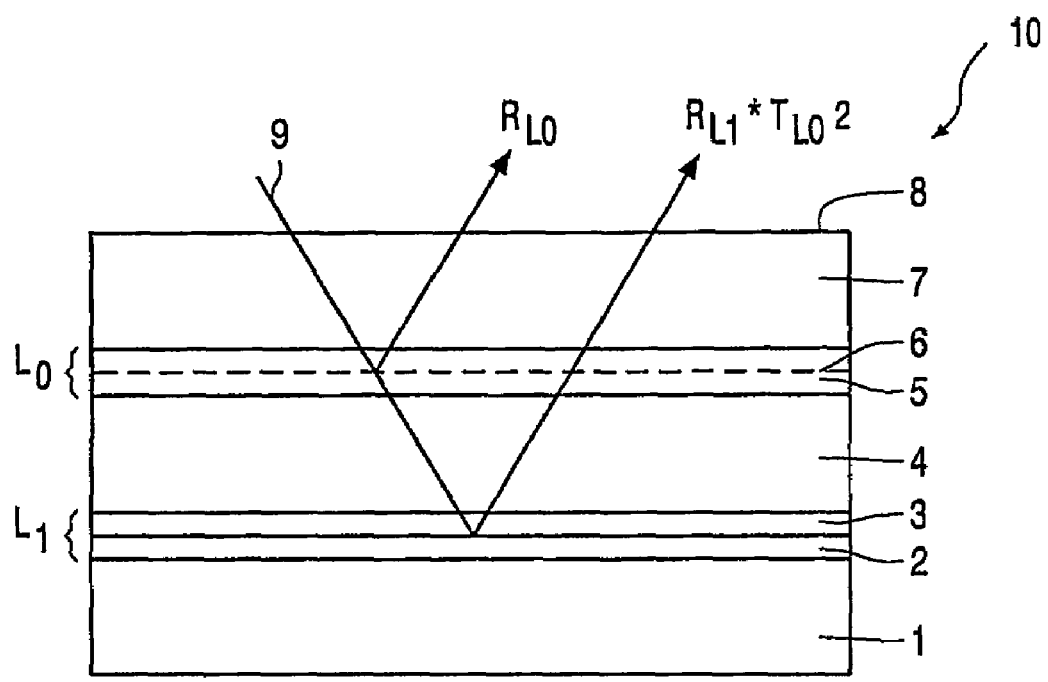
FIG. 2 shows a schematic layout of an embodiment of the optical data storage medium according to the invention including the two stacks $L_0$ and $L_1$.

In FIG. 1b the effective total reflection from the $L_1$ stack as a function of the intrinsic reflection of $L_1$ is drawn. Examples for three different transmission values T of the $L_0$ stack are shown;

In FIG. 2 a dual-stack optical data storage medium 10 for recording using a focused laser beam 9 having a wavelength 655 nm is shown. The laser beam 9 enters through an entrance face 8 of the medium 10 during recording. The medium 10 comprises a substrate 7 with present on a side thereof a first recording stack 5 named $L_0$, comprising a write-once type $L_0$ recording layer 6 having a complex refractive index $\tilde{n}_{L0} = n_{L0} - i.k_{L0}$ and having a thickness $d_{L0}$. The first recording stack $L_0$ has an optical reflection value $R_{L0}$ and an optical transmission value $T_{L0}$. A second recording stack 2 named $L_1$ comprising a write-once type $L_1$ recording layer 3 having a complex refractive index $\tilde{n}_{L1} = n_{L1} - i.k_{L1}$ and having a thickness $d_{L1}$ is present. The second recording stack $L_1$ has an optical reflection value $R_{L1}$. The optical parameters are all measured at the laser beam wavelength. The first recording stack 5 is present at a position closer to the entrance face 8 than the second recording stack 3. A transparent spacer layer 4 is sandwiched between the recording stacks 2 and 5. The transparent spacer layer 4 has a thickness substantially larger than the depth of focus of the focused radiation beam 9.

To meet the DVD-ROM dual layer specification, the effective reflection level from the upper recording stack $L_0$, being equal to $R_{L0}$, and the effective reflection level from the lower recording stack $L_1$, being equal to $R_{L1}*(T_{L0})^2$, should both fall in the range 18% to 30%: $0.18 \leq R_{L0} \leq 0.30$ and $0.18 \leq R_{L1}*(T_{L0})^2 \leq 0.30$. In practice, effective reflection levels>12% are sufficient for read-out compatibility on existing DVD players. Practical ranges of $T_{L0}$ and $R_{L1}$ for which the latter condition can be achieved, are: $0.45 \leq T_{L0} \leq 0.75$ and $0.40 \leq R_{L1} \leq 0.80$ and $k_{L0} < 0.3$ and $k_{L1} < 0.3$. Thus, with the proper combination of $R_{L0}$, $T_{L0}$ and $R_{L1}$ a DVD+R dual layer (DL) medium is achieved compatible with the DVD-ROM dual layer specification as far as reflection levels are concerned. A DVD+R DL disc could consist of any combination of $L_0$-stack and $L_1$-stack. One specific embodiment would be:

Medium of type 2 (see FIG. 16b), with $L_0$ embodiment stack 5 (95 nm dye/10 nm Ag/55 nm ZnS—SiO$_2$) and $L_1$ embodiment stack 3 (15 nm Ag/130 nm dye/100 nm Ag), having transparent spacer 4 thickness of 55 μm. Effective reflection from $L_0$ is 28%, effective reflection (through $L_0$) from $L_1$ is 21%. By using dyes as recording layer, which dyes are almost transparent at the laser recording wavelength, recording stacks with high transmission suitable for multi-stack media can be fabricated. This is typically the case in write-once optical media such as CD-R and DVD+R. Below follow different $L_0$ stack designs, in which an organic dye is incorporated. The designs have a high transparency (in order to enable addressing lower-lying stacks) and finite reflectivity (necessary for read-out). The parameter ranges are tuned such as to meet the specifications for the upper recording stack $L_0$ in a recordable dual-stack DVD disc:

$R_{L0} \geq 18\%$, $T_{L0} \geq 50\%$.

The lower limit for $T_{L0}$ may be lower, e.g. 45%, if $L_1$ is very highly reflective. To understand the thickness ranges proposed for the different stacks below, it is helpful to note that:
(i) The reflection and transmission of the stacks are periodic in $\lambda/2n$.
(ii) The extrema in reflection and transmission of the stacks nearly coincide due to the intrinsic high transparency of the recording layer, e.g. dyes k<n).

Figure 3:
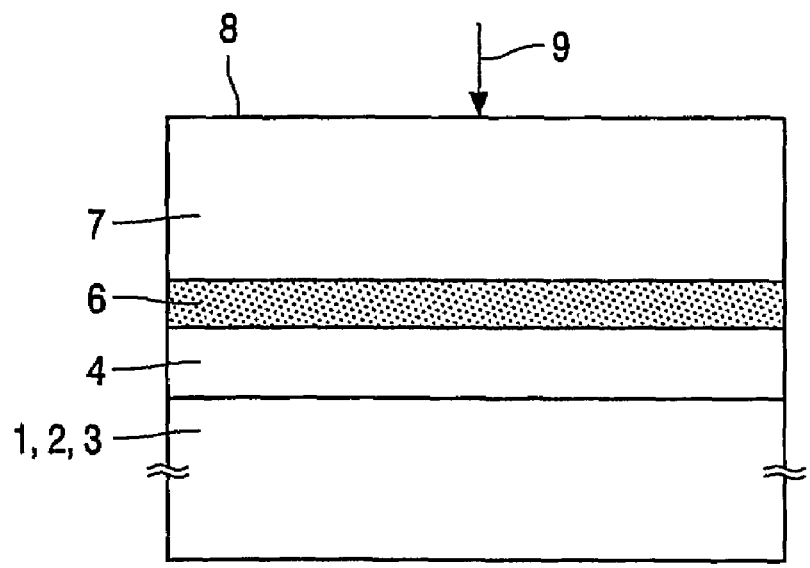
FIG. 3 shows a schematic layout of an embodiment of the $L_0$ stack of the optical data storage medium (recording layer-only $L_0$ stack design)

In FIG. 3 an embodiment of the $L_0$ stack of the dual-stack optical data storage medium 10 is shown having a recording layer 6 wherein $n_{L0}$24 2.5 and $d_{L0}$ is in the range of $\lambda/8n_{L0} \leq d_{L0} \leq 3\lambda/8n_{L0}$ or $5\lambda/8n_{L0} \leq d_{L0} \leq 7\lambda/8n_{L0}$. The symbols have described with FIG. 2. The recording layer 6 is a 59 nm thick azo-dye having a refractive index $ñ_{L0}=2.68-i.0.23$. The reflection $R_{L0}=0.18$ and the transmission $T_{L0}=0.58$. The wavelength $\lambda$ is 655 nm.

Figure 4A:
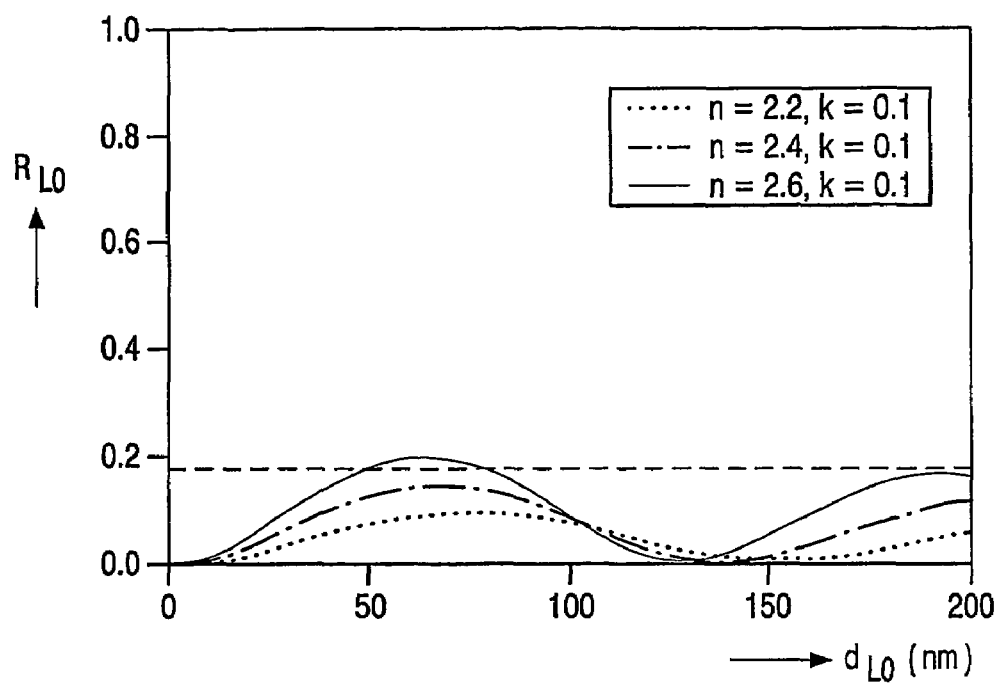
FIG. 4a shows the calculated reflectivity as a function of the recording layer thickness $d_{L0}$ for three values of the recording layer refractive index $n_{L0}$.

In FIG. 4a the calculated reflectivity as a function of the recording layer 6 thickness $d_{L0}$ for three values of the recording layer's refractive index $n_{L0}$ is drawn. Notice that a reflection level of more than 0.18 can be achieved when the recording layer 6 has a refractive index $n_{L0}$ larger than 2.5. The optima in reflection are located at thickness of $(\frac{1}{2}+p)*\lambda/2$ with p an integer.

Figure 4B:
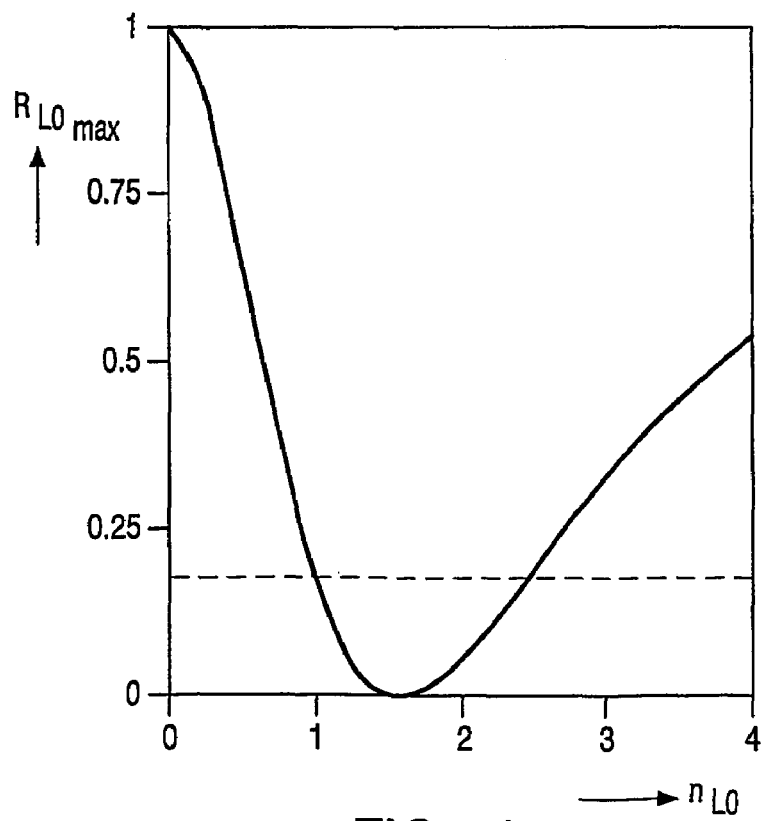
FIG. 4b shows the maximally attainable reflectivity of a single recording layer in an optical data storage medium.

In FIG. 4b the maximally attainable reflectivity of a single recording layer in an optical data storage medium (recording layer is embedded in polycarbonate background having a refractive index n=1.6) is shown. The dashed line indicates the value R=18%.

Figure 5:
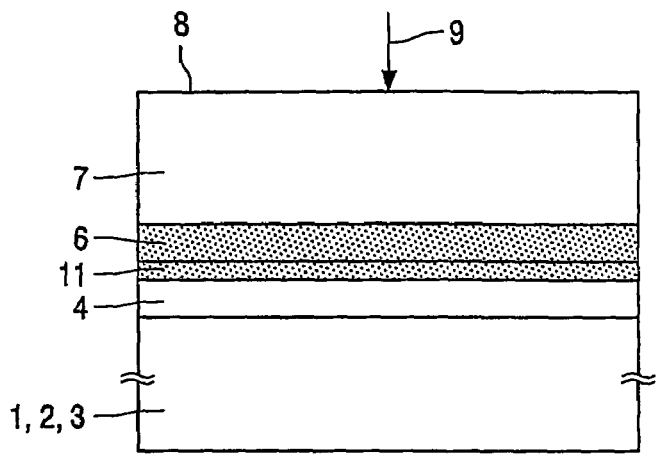
FIG. 5 shows a schematic layout of another embodiment of the $L_0$ stack of the optical data storage medium.

In FIG. 5 an embodiment of the $L_0$ stack of the dual-stack optical data storage medium 10 is shown having a recording layer 6 wherein a first metal reflective layer 11, having a thickness $d_{M1} \leq 25$ nm, is present between the write-once $L_0$ recording layer 6 and the transparent spacer layer 4 and $d_{L0}$ is in the range of $\lambda/8n_{L0} \leq d_{L0} \leq 5\lambda/8n_{L0}$. The symbols have the meaning as described with FIG. 2. The recording layer 6 is a 100 nm thick azo-dye (JJAP 37 (1998) 2084) having a refractive index $ñ_{L0}=2.44-i.0.06$. The wavelength $\lambda$ of th focused laser beam 9 is 655 nm.

Figure 6A:
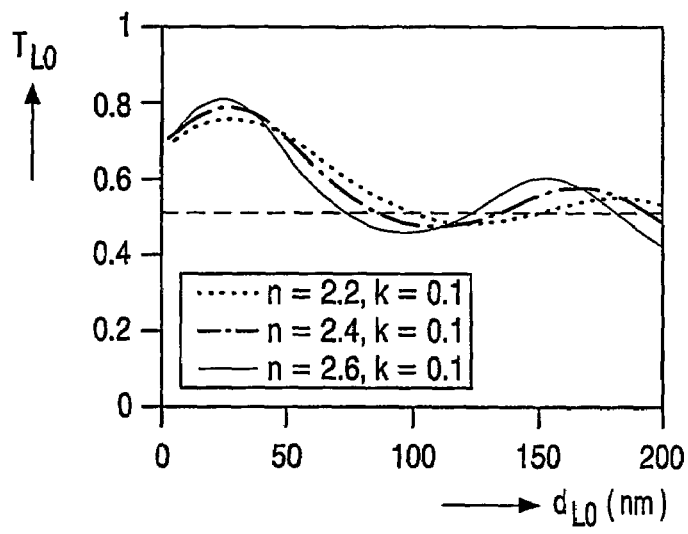
FIG. 6a shows a graph of the transmission of the stack of FIG. 5 as a function of the recording layer thickness for three values of the refractive index of the recording layer. The dashed line indicates the lower limits allowed for T.

The following results may be obtained when the first metal reflective layer 11 is:
  8 nm Ag (n=0.16, k=5.34) $R_{L0}=0.21$, $T_{L0}=0.53$
  10 nm Au (n=0.28, k=3.9) $R_{L0}=0.27$, $T_{L0}=0.52$
  10 nm Cu (n=0.23, k=3.7) $R_{L0}=0.25$, $T_{L0}=0.55$ In FIG. 6a a calculated graph of the transmission $T_{L0}$ of the stack of FIG. 5 as a function of the recording layer 6 thickness $d_{L0}$ for three values of the refractive index $n_{L0}$ of the recording layer 6 is shown. The first metal reflective layer 11 is 10 nm Ag. The dashed line indicates the 50% value for T.

Figure 6B:
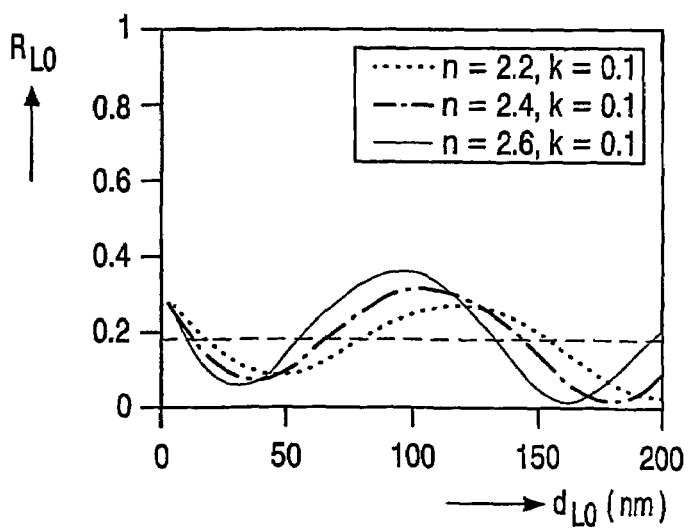
FIG. 6b shows the reflection of these same stacks as function of the recording layer thickness.

In FIG. 6b the calculated reflection $R_{L0}$ of this same stack as function of the recording layer 6 thickness $d_{L0}$ is shown. The dashed red line indicates the lower limits allowed for R. The maxima in R and minima in T are located at thickness $(p-\Delta)*\lambda/2nd$, where p is an integer and $\Delta \sim \frac{1}{8}$ to $\frac{1}{4}$. The minima in R and maxima in T are located at thickness $(p+\frac{1}{2}-\Delta)*\lambda/2nd$.

Figure 7A:
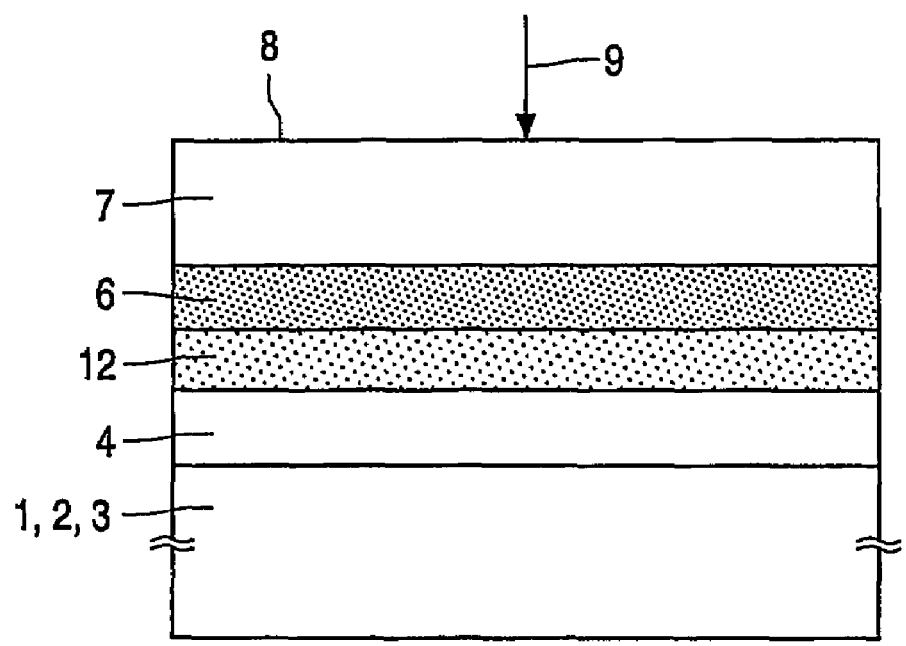
FIG. 7a shows a schematic layout of another embodiment of the $L_0$ stack of the optical data storage medium.
Figure 7B:
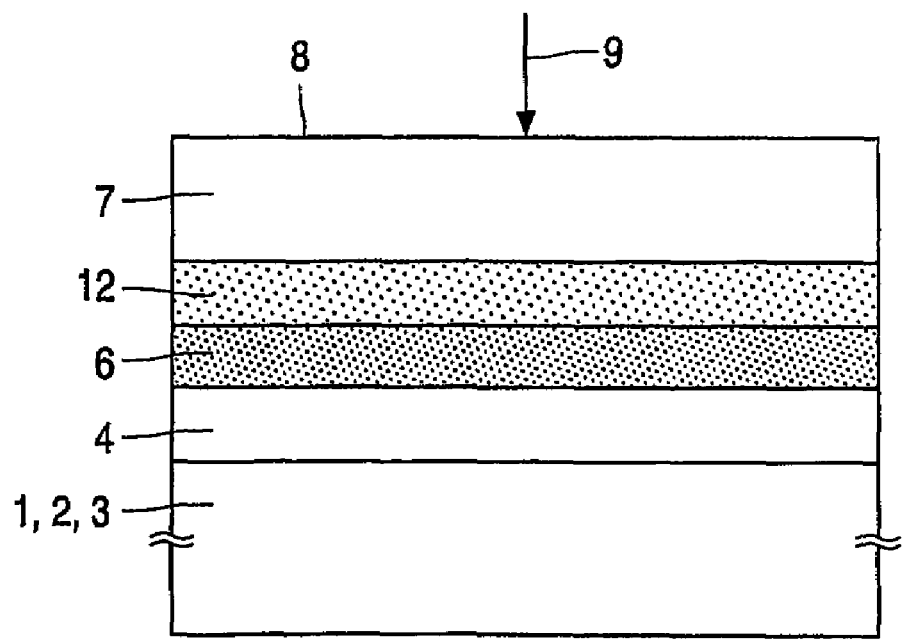
FIG. 7b shows a schematic layout of another embodiment of the $L_0$ stack of the optical data storage medium.

In FIGS. 7a and 7b two embodiments of the $L_0$ stack of the dual-stack optical data storage medium are shown wherein a second transparent auxiliary layer I2 with reference numeral 12, having a refractive index $n_{I2}$ and having a thickness $d_{I2}$ in the range of $0<d_{I2} \leq 3\lambda/8n_{I2}$, is present adjacent the write-once $L_0$ recording layer 6 and $d_{L0}$ is in the range of $\lambda/8n_{L0} \leq d_{L0} \leq 3\lambda/8n_{L0}$ or $5\lambda/8n_{L0} \leq d_{L0} \leq 7\lambda/8n_{L0}$. In FIG. auxiliary layer 12 is present at a side of the write-once $L_0$ recording layer 6 most remote from the entrance face 8 and $n_{I2} \leq n_{L0}/1.572$. The second transparent auxiliary layer I2 is a dielectric layer made of $SiO_2$ with a refractive index $n_{I2}=1.44$ and a thickness $d_{I2}=114$ nm. The recording layer 6 is an azo-dye (JJAP 37 (1998) 2084) having a refractive index $ñ_{L0}=2.44-i.0.06$ and a thickness $d_{L0}=67$ nm. The wavelength $\lambda$ of the focused laser beam 9 is 655 nm. The following reflection and transmission may be obtained: $R_{L0}=0.20$, $T_{L0}=0.72$.

Figure 8A:
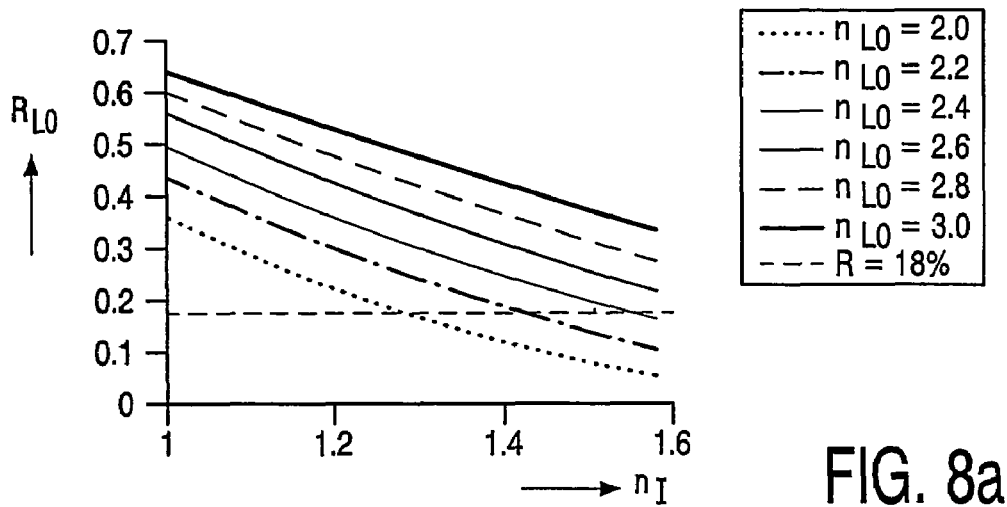
FIG. 8a shows the maximum reflectivity of a recording layer/auxiliary layer stack as a function of the refractive index $n_I$ of the auxiliary layer I for five values of the recording layer's refractive index $n_{L0}$.

In FIG. 8a the maximum reflectivity of a recording layer/auxiliary layer stack is shown as a function of the refractive index $n_I$ of the auxiliary layer I for five values of the recording layer's refractive index $n_{L0}$ is shown. The dashed line indicates the 18% value for R.

Figure 8B:
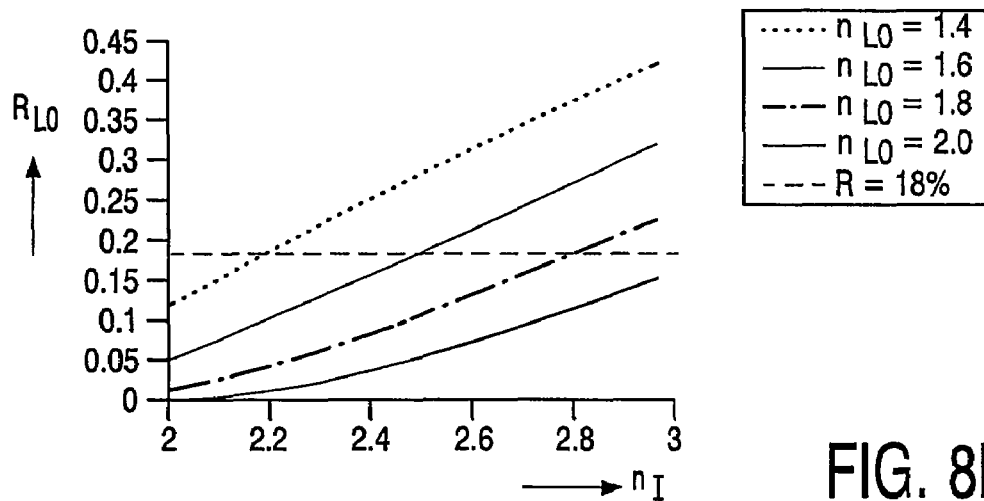
FIG. 8b shows the maximum reflectivity of an auxiliary layer/recording layer stack as a function of the refractive index $n_I$ of the auxiliary layer I for five values of the recording layer's refractive index $n_{L0}$.

In FIG. 8b the maximum reflectivity of an auxiliary layer/recording layer stack as a function of the refractive index $n_I$ of the auxiliary layer I for five values of the recording layer's refractive index $n_{L0}$ is shown. The dashed line indicates the 18% value for R.

Figure 9:
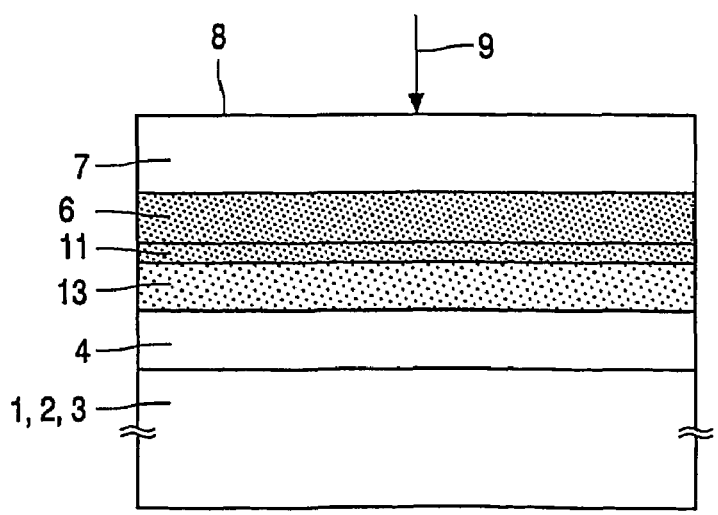
FIG. 9 shows a schematic layout of another embodiment of the $L_0$ stack of the optical data storage medium.

In FIG. 9 an embodiment of the $L_0$ stack of the dual-stack optical data storage medium 10 is shown as in FIG. 5 wherein additionally a first transparent auxiliary layer 13 ( I1), having a refractive index $n_{I1} \geq 1.8$ and having a thickness $d_{I1} \leq \lambda/2n_{I1}$, is present between the first metal reflective layer 11 and the transparent spacer layer 4. Preferably $d_{I1} \leq \lambda/4n_{I1}$. The symbols have the meaning as described with FIG. 2. The recording layer 6 is a 95 nm thick azo-dye (JJAP 37 (1998) 2084) having a refractive index $ñ_{L0}=2.44-i.0.06$. The wavelength $\lambda$ of the focused laser beam 9 is 655 nm.

The following results may be obtained when the first metal reflective layer 11 and the first auxiliary layer 13 respectively are:
  10 nm Ag (n=0.16, k=5.34) and 55 nm $(ZnS)_{80}(SiO_2)_{20}$ (n=2.15): $R_{L0}=0.28$
  10 nm Cu (n=0.23, k=3.7) and 20 nm $(ZnS)_{80}(SiO_2)_{20}$: $R_{L0}=0.19$, $T_{L0}=$ In FIG. 10a a comparison between the transmission of a recording layer/thin-metal reflective layer stack ($n_{L0}=2.4$, $k_{L0}=0.1$, 10 nm Ag) and a recording layer/thin-metal reflective layer/auxiliary-layer stack ($n_{L0}=2.4$, $k_{L0}=0.1$, 10 nm Ag, $n_I=2.1$, $d_I=50$ nm) as a function of the recording layer thickness $d_{L0}$ is shown. The dashed line indicates the 50% value for T.

Figure 10A:
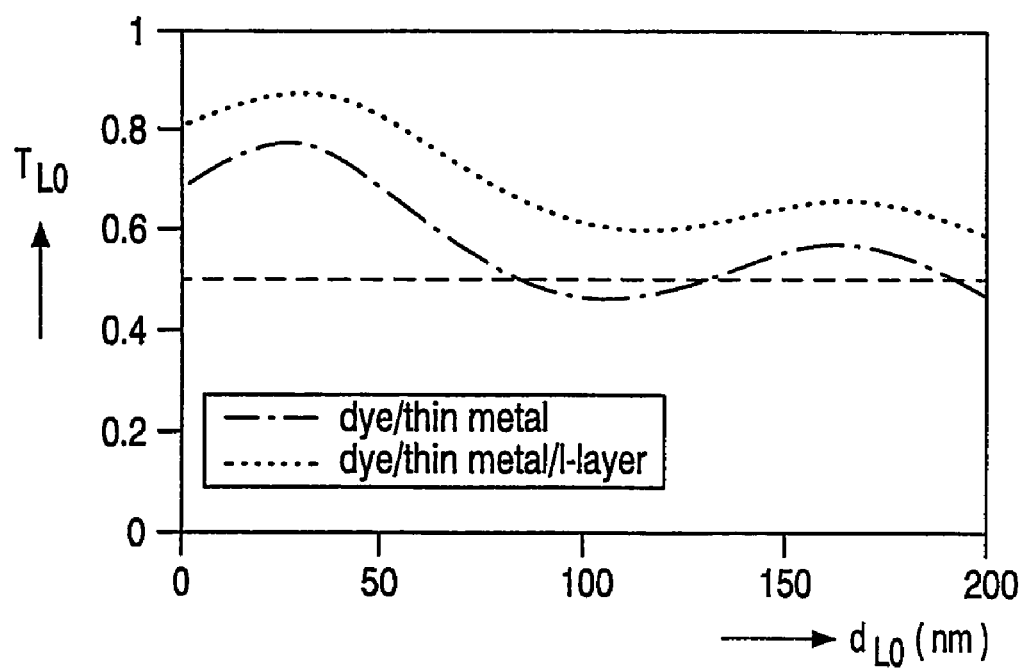
FIG. 10a shows a comparison between the transmission of a recording layer/thin-metal reflective layer stack and a recording layer/thin-metal reflective layer/auxiliary-layer stack as a function of the recording layer thickness.
Figure 10B:
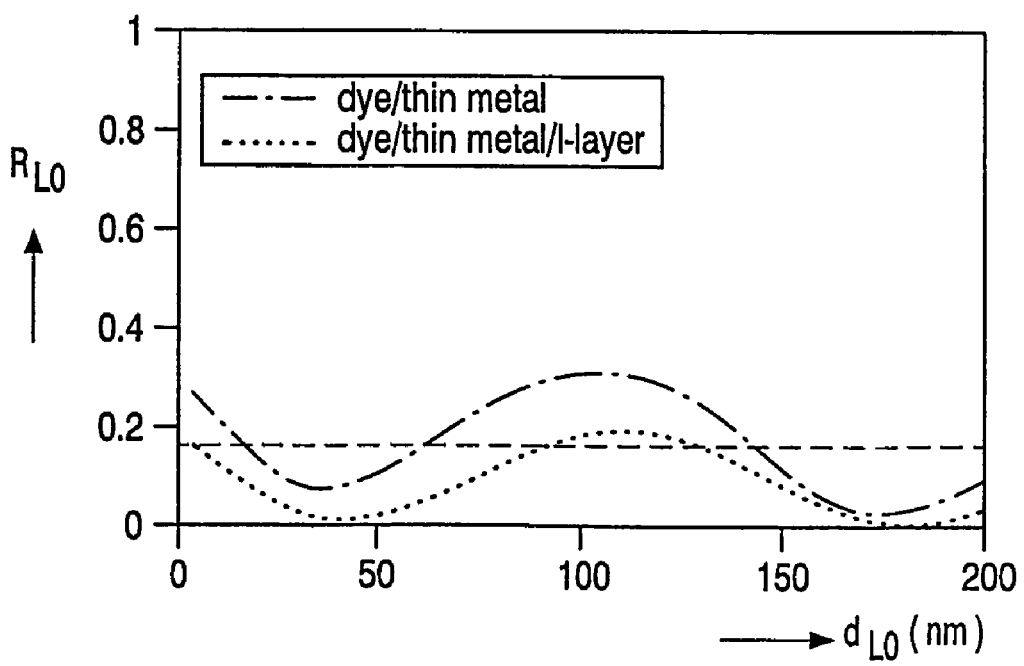

In FIG. 10b the reflection as a function of the recording layer thickness $d_{L0}$ for the stacks of FIG. 10a is shown. The dashed line indicates the 18% value for R.

Figure 11:
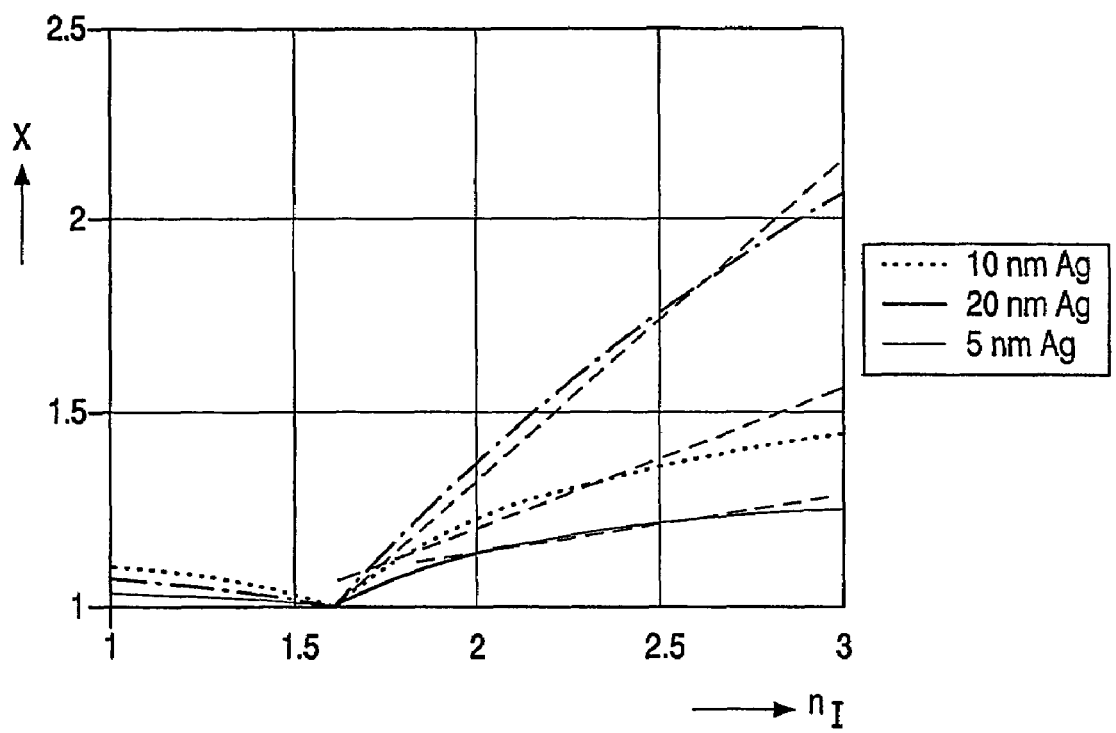
FIG. 11 shows the maximum factor (X) by which the transmission of a recording layer/thin-metal reflective layer stack can be increased when adding an auxiliary I-layer adjacent the metal reflective layer.

In FIG. 11 the maximum factor (X) by which the transmission of a recording layer/thin-metal reflective layer stack can be increased when adding an auxiliary I-layer adjacent the metal reflective layer as a function of the refractive index of the I-layer for three values of metal layer thickness. The dashed lines indicate linear approximations of the functions $X(n_I)$ in the range $1.8 \leq n_I \leq 3.0$.

It may be advantageous to apply a transparent heat sink in the $L_0$ recording stack instead of or in addition to the auxiliary layer(s). This may lead to improved recording performance due to heat sink action. The types of $L_0$ stack that can be used have been described with FIG. 7 and FIG. 9. In these two stack types an auxiliary, i.e. dielectric layer, is present to tune the reflection and transmission values. Typical dielectric materials used are ZnS—SiO2 or $SiO_2$, etc. These dielectric materials have poor heat conductivity, typically <1 W/mK. An improved heat sink function can be obtained by replacing the dielectric with for instance ITO, HfN, or AlON which have a heat conductivity >1 W/mK (ITO has about 3.6 W/mK). These materials have optical constants close to typical dielectrics (n~2, k<0.05), therefore optical stack designs similar to those of e.g. FIG. 7 and FIG. 9 can be used.

Figure 12:
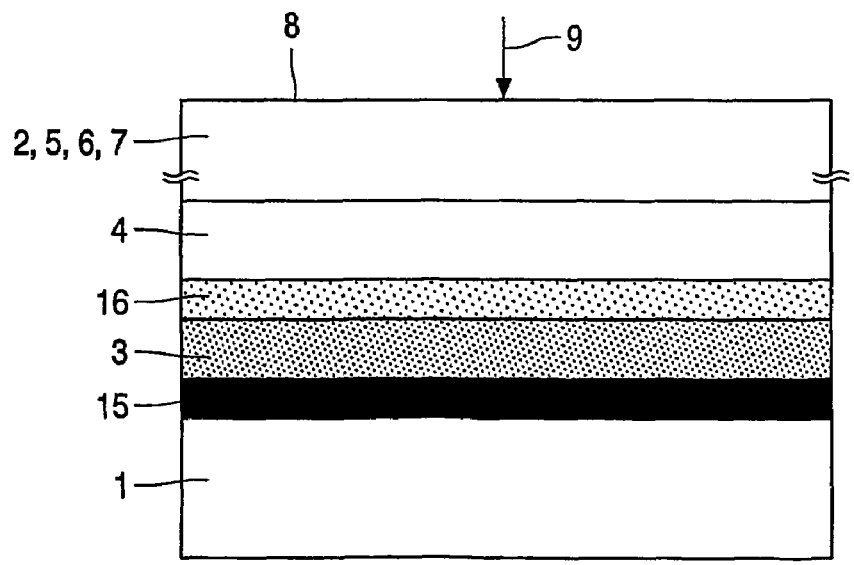
FIG. 12 shows a schematic layout of an embodiment of the $L_1$ stack of the optical data storage medium design: auxiliary layer/recording layer/relatively thick metal reflective layer.

In FIG. 12 a schematic layout of an embodiment of the $L_1$ stack of the optical data storage medium 10 is shown. The symbols have the meaning as described with FIG. 2. A second metal reflective layer 15 is present at a side of the write-once type $L_1$ recording layer 3 most remote from the entrance face 8. The second metal reflective layer 15 has a thickness $d_{M1} \geq 25$ nm and $d_{L1}$ is in the range of $0<d_{L1} \leq 3\lambda/4n^{L1}$. A third transparent auxiliary layer 16 (I3), having a refractive index $n_{I3}$ and having a thickness $d_{I3}$ in the range $0<d_{I3} \leq \lambda/n_{I3}$, is present adjacent the write-once type $L_1$ recording layer 3 at a side of the write-once type $L_1$ recording layer 3 closest to the entrance face 8.

$R_{L1}$ is the intrinsic reflection of the $L_1$ stack. The effective reflection as defined in annex D of the DVD read-only-disk book should be in the range 18% $\leq R_{L1eff} \leq 30\%$ $T_{L0}$ is the intrinsic transmission of the $L_0$ stack, i.e. for the lower lying $L_1$ stack having intrinsic reflection $R_{L1}$ the effective reflection in a true dual-stack medium will be $T_{L0}^2 * R_{L1}$ The recording layer 3 is a 130 nm thick azo-dye (mat sc. and eng. B79 (2001) 45.) having a refractive index $\tilde{n}_{L0} = 2.44-i.0.06$. The wavelength $\lambda$ of the focused laser beam 9 is 655 nm. The fourth transparent auxiliary layer 16 is 50 nm $SiO_2$ (n=1.44) and the second metal reflective layer is 100 nm Ag. A reflection $R_{L1}=0.73$ is achieved.

Figure 13:
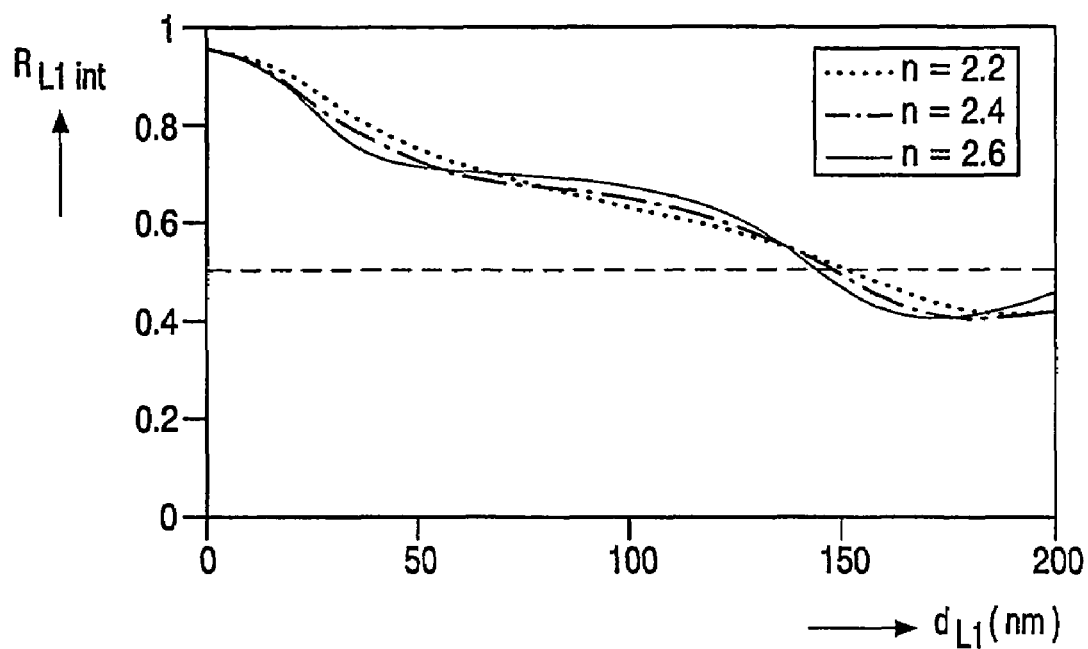
FIG. 13 shows the intrinsic reflection of the $L_1$ stack design of FIG. 12 as a function of the recording layer thickness ($k_{L1}$=0.1) for three values of the refractive index $n_{L1}$ of the recording layer. The dashed line indicates the 50% reflection level, which is a practical lower limit for the $L_1$ intrinsic reflectivity.

FIG. 13 shows the intrinsic reflection of the $L_1$ stack design of FIG. 12 as a function of the recording layer thickness ($k_{L1}=0.1$) for three values of the refractive index $n_{L1}$ of the recording layer. The dashed line indicates the 50% reflection level, which is a practical value for the $L_1$ intrinsic reflectivity.

Figure 14:
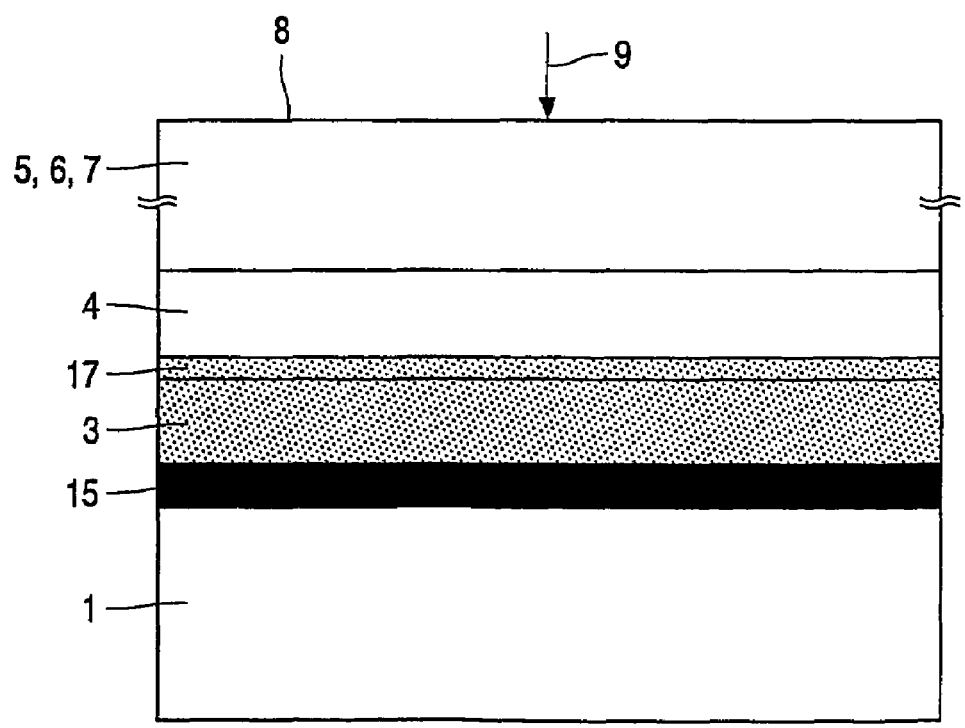
FIG. 14 shows a schematic layout of another embodiment of the $L_1$ stack of the optical data storage medium (design: thin metal layer/recording layer/relatively thick metal layer).

In FIG. 14 a schematic layout of an embodiment of the $L_1$ stack of the optical data storage medium 10 is shown. The symbols have the meaning as described with FIG. 2. A third metal reflective layer 17, having a thickness $d_{M3}$ in the range of $0<d_{M3} \leq 25$ nm, is present at a side of the write-once $L_1$ recording layer 3 closest to the entrance face 8 and $d_{L1}$ is in the range of $0<d_{L1} \leq 5\lambda/16n_{L1}$ or $7\lambda/16n_{L1} \leq d_{L1} \leq \lambda/n_{L1}$.

The second metal reflective layer 15 has a thickness $d_{M1} \geq 5$ nm. $R_{L1}$ is the intrinsic reflection of the $L_1$ stack. The effective reflection as defined in annex D of the DVD read-only-disk book should be in the range 18% $\leq R_{L1eff} \leq 30\%$. $T_{L0}$ is the intrinsic transmission of the $L_0$ stack, i.e. for the lower lying $L_1$ stack having intrinsic reflection $R_{L1}$ the effective reflection in a true dual-stack medium will be $T_{L0}^2 * R_{L1}$ The recording layer 3 is a 150 nm thick azo-dye (JJAP 37 (1998) 2084.) having a refractive index $\tilde{n}_{L0}=2.44-i.0.06$. The wavelength $\lambda$ of the focused laser beam 9 is 655 nm. The third metal reflective layer 17 is 15 nm Ag. A reflection $R_{L1}=0.8$ is achieved.

In another embodiment (not drawn) a fourth transparent auxiliary layer I4, having a refractive index $n_{I4}$ and having a thickness $d_{I4}$ in the range of $0<d_{I4} \leq 3\lambda/16n_{I4}$, may be present between the write-once $L_1$ recording layer and the second metal reflective layer 15. In the latter case the recording layer 3 is a 55 nm thick azo-dye (JJAP 37 (1998) 2084.) having a refractive index $\tilde{n}_{L0}=2.44-i.0.06$. The wavelength $\lambda$ of the focused laser beam 9 is 655 nm. The third metal reflective layer 17 is 10 nm Au. The fourth transparent auxiliary layer is 60 nm $SiO_2$. A reflection $R_{L1}=0.63$ is achieved.

Figure 15:
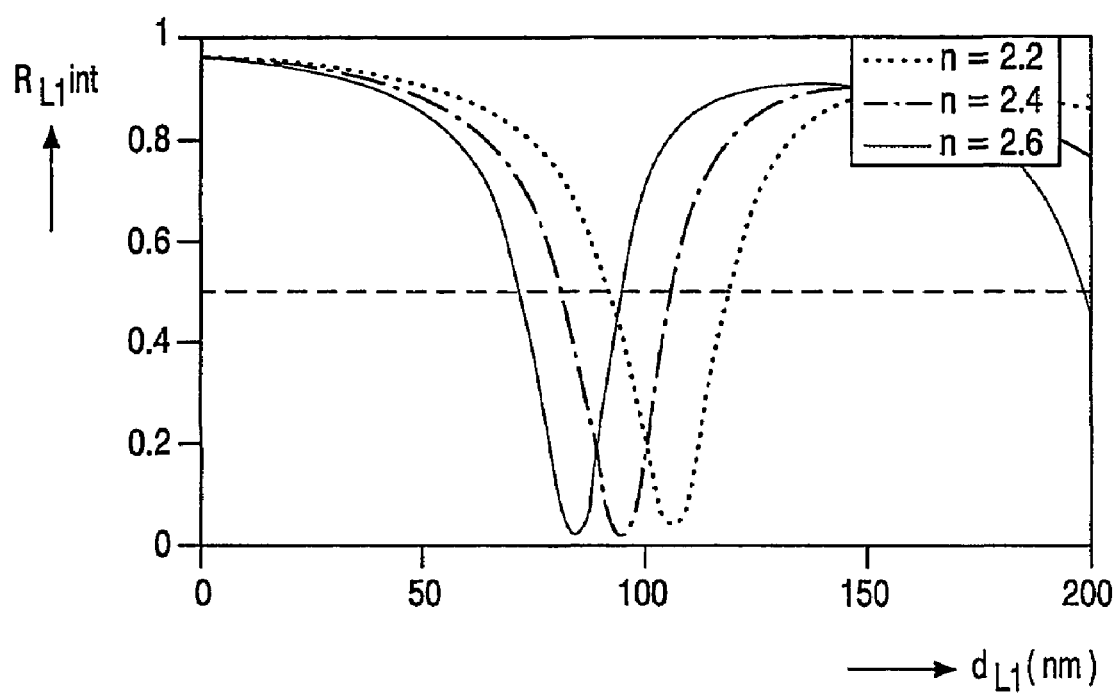
FIG. 15 shows the intrinsic reflection of the $L_1$ stack design of FIG. 14 as a function of the recording thickness.

In FIG. 15 the intrinsic reflection of the $L_1$ stack design of FIG. 14 as a function of the recording thickness ($k_{L1}=0.1$) for three values of the refractive index $n_{L1}$ of the recording layer is shown. The dashed line indicates the 50% reflection level, which is a practical lower limit for the $L_1$ intrinsic reflectivity.

Figure 16A:
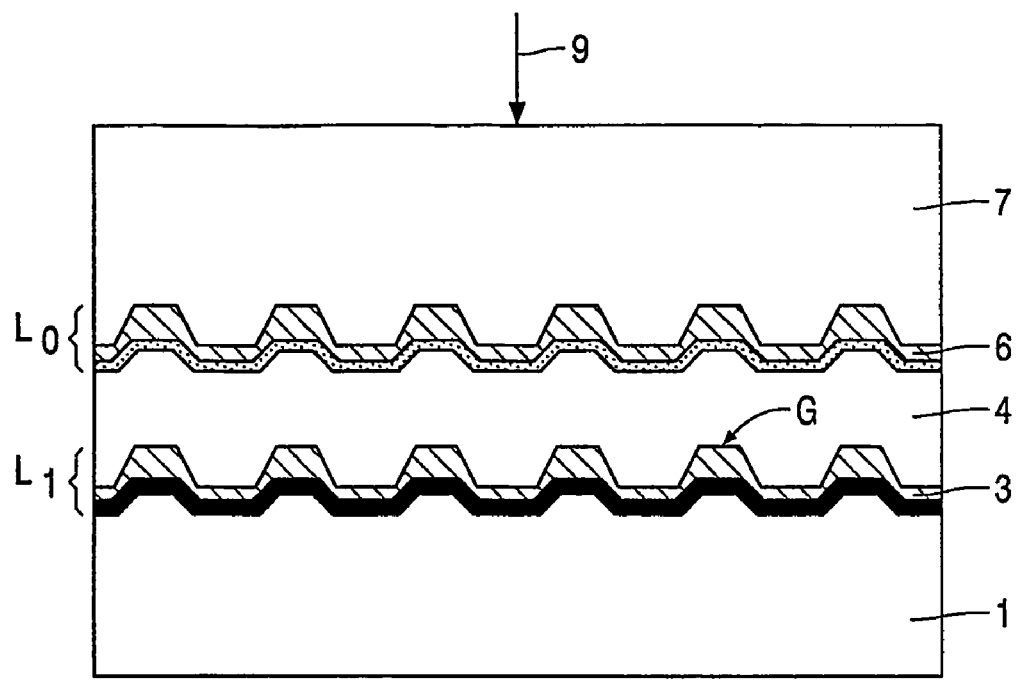
FIG. 16a shows a type 1 optical data storage medium.

In FIG. 16a a so-called type 1 medium is described. An optical recording stack ($L_0$), optically semi-transparent at the laser wavelength, is applied to a transparent, pre-grooved substrate 7. A transparent spacer layer 4 is attached to the $L_0$ stack. The spacer layer 4 either contains pregrooves (G) for $L_1$ or pregrooves (G) for $L_1$ are mastered into the spacer layer 4 after application to $L_0$. Second recording stack $L_1$ is deposited on the grooved spacer layer 4. Finally, a counter substrate 1 is applied.

Figure 16B:
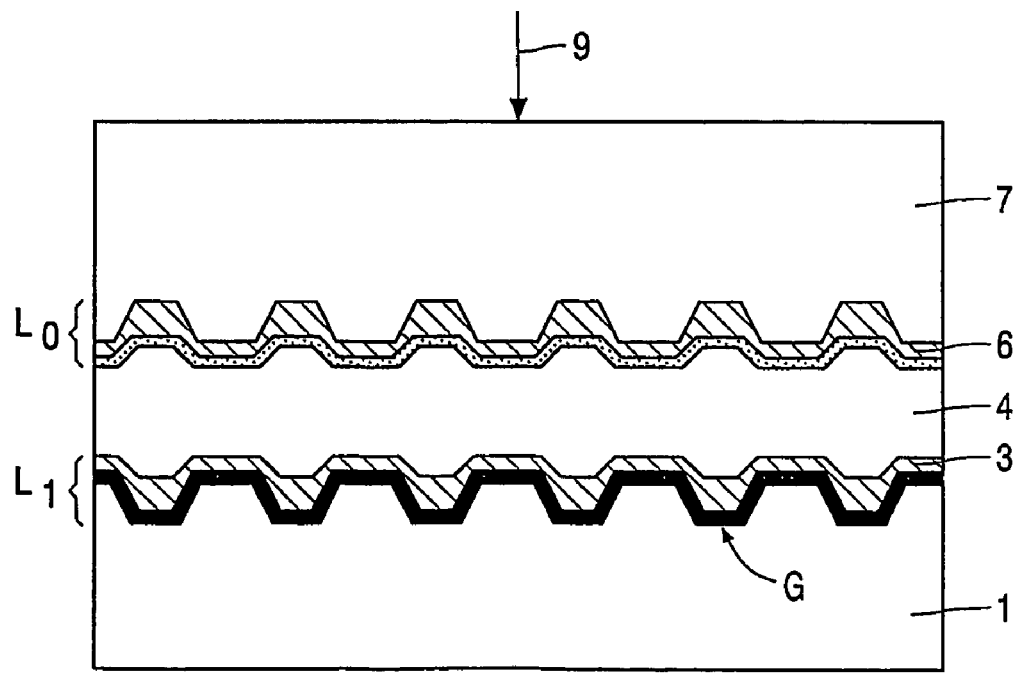
FIG. 16b shows a type 2 optical data storage medium.

In FIG. 16b a so-called type 2 medium is described. An optical recording stack ($L_0$), optically semi-transparent at the laser wavelength, is applied to a transparent, pre-grooved substrate 7. A second optical recording stack $L_1$, reflective at the laser wavelength, is applied to a second transparent pre-grooved (G) substrate 1. This substrate 1 with $L_1$ is attached to the substrate 7 with $L_0$ with a transparent spacer layer 4 in between. Preferred spacer-layer thickness for both disc types is 40 μm to 70 μm.

The stacks proposed in this document are not restricted to use in DVD+R-DL and can be applied in any (multi-stack) organic-dye based optical recording medium. The thickness and optical constant ranges specified, however, are such as to meet the requirements for an $L_0$- and $L_1$-stack of a DVD+R-DL medium. It should be noted that the actual recording of marks does not necessarily take place in the groove G but may take place in the area between grooves, also referred to as on-land. In this case the guide groove G merely serves as a servo tracking means with the actual radiation beam recording spot being present on-land.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention a dual-stack optical data storage medium for write-once recording using a focused radiation beam entering through an entrance face of the medium is described. The medium comprises at least one substrate with present on a side thereof a first recording stack named $L_0$, comprising a write-once type $L_0$ recording layer with an absorption $k_{L0}$ and a second recording stack named $L_1$ comprising a write-once type $L_1$ recording layer with an absorption $k_{L1}$. The first recording stack $L_0$ has an optical reflection value $R_{L0}$ and an optical transmission value $T_{L0}$ and the second recording stack has an optical reflection value $R_{L1}$. The first recording stack is present at a position closer to the entrance face than the second recording stack. When the following conditions are fulfilled: $0.45 \leq T_{L0} \leq 0.75$ and $0.40 \leq R_{L1} \leq 0.80$ and $k_{L0}<0.3$ and $k_{L1}<0.3$ a dual stack write-once medium is achieved which can be played in a standard DVD-ROM player. Several stack designs are described fulfilling the above conditions.

The invention claimed is:

1. A dual-stack optical data storage medium for write-once recording using a focused radiation beam having a wavelength λ and entering through an entrance face of the medium during recording, comprising:
   at least one substrate with present on a side thereof:
   a first recording stack $L_0$ comprising a write-once type first recording layer having a complex refractive index $\tilde{n}_{L0} = n_{L0} - i.k_{L0}$ and having a thickness $d_{L0}$, said first recording stack $L_0$ having an optical reflection value $R_{L0}$ and an optical transmission value $T_{L0}$,
   a second recording stack $L_1$ comprising a write-once type second recording layer having a complex refractive index $\tilde{n}_{L1} = n_{L1} - i.k_{L1}$ and having a thickness $d_{L1}$, said second recording stack $L_1$ having an optical reflection value $R_{L1}$, all parameters being defined at the wavelength λ,
   said first recording stack being present at a position closer to the entrance face than the second recording stack,
   a transparent spacer layer sandwiched between the recording stacks, said transparent spacer layer having a thickness substantially larger than the depth of focus of the focused radiation beam,
   wherein $0.45 \leq T_{L0} \leq 0.75$ and $0.40 \leq R_{L1} \leq 0.80$ and $k_{L0} < 0.3$ and $k_{L1} < 0.3$.

2. A dual-stack optical data storage medium as claimed in claim 1, wherein λ is approximately 655 nm.

3. The dual-stack optical data storage medium as claimed in claim 1, wherein for the write-once first recording layer the following conditions are fulfilled $n_{L0} \geq 2.5$ and $d_{L0}$ is in the range of $\lambda/8n_{L0} \leq d_{L0} \leq 3\lambda/8n_{L0}$ or $5\lambda/8n_{L0} \leq d_{L0} \leq 7\lambda/8n_{L0}$.

4. The dual-stack optical data storage medium as claimed in claim 1, wherein a first metal reflective layer, having a thickness $d_{M1} \leq 25$ nm, is present between the write-once first recording layer and the transparent spacer layer and $d_{L0}$ is in the range of $\lambda/8n_{L0} \leq d_{L0} \leq 5\lambda/8n_{L0}$.

5. The dual-stack optical data storage medium as claimed in claim 4, wherein a transparent auxiliary layer I1, having a refractive index $n_{I1} \geq 1.8$ and having a thickness $d_{I1} \leq \lambda/2n_{I1}$, is present between the first metal reflective layer and the transparent spacer layer.

6. The dual-stack optical data storage medium as claimed in claim 5, wherein $d_{I1} \leq \lambda/4n_{I1}$.

7. The dual-stack optical data storage medium as claimed in claim 1, wherein a transparent auxiliary layer I2, having a refractive index $n_{I2}$ and having a thickness $d_{I2}$ in the range of $0 < d_{I2} \leq 3\lambda/8n_{I2}$, is present at a side of the write-once first recording layer and $d_{L0}$ is in the range of $\lambda/8n_{L0} \leq d_{L0} \leq 3\lambda/8n_{L0}$ or $5\lambda/8n_{L0} \leq d_{L0} \leq 7\lambda/8n_{L0}$.

8. The dual-stack optical data storage medium as claimed in claim 7, wherein the transparent auxiliary layer is present at a side of the write-once first recording layer most remote from the entrance face and $n_{I2} \leq n_{L0}/1.572$.

9. The dual-stack optical data storage medium as claimed in claim 7, wherein the transparent auxiliary layer is present at a side of the write-once first recording layer closest to the entrance face and $n_{I2} \geq n_{L0}/0.636$.

10. The dual-stack optical data storage medium as claimed in claim 4, wherein a second metal reflective layer is present at a side of the second recording stack $L_1$ recording layer most remote from the entrance face.

11. The dual-stack optical data storage medium as claimed in claim 10, wherein the second metal reflective layer has a thickness $d_{M1} \geq 25$ nm.

12. The dual-stack optical data storage medium as claimed in claim 11, wherein $d_{L1}$ is in the range of $0 < d_{L1} \leq 3\lambda/4n_{L1}$.

13. The dual-stack optical data storage medium as claimed in claim 12, wherein a transparent auxiliary layer I3, having a refractive index $n_{I3}$ and having a thickness $d_{I3}$ in the range $0 < d_{I3} \leq \lambda/n_{I3}$, is present adjacent the write-once type second recording layer at a side of the write-once type second recording layer closest to the entrance face.

14. The dual-stack optical data storage medium as claimed in claim 11, wherein a third metal reflective layer, having a thickness $d_{M3}$ in the range of $0 < d_{M3} \leq 25$ nm, is present at a side of the write-once first recording layer closest to the entrance face and $d_{L1}$ is in the range of $0 < d_{L1} \leq 5\lambda/16n_{L1}$ or $7\lambda/16n_{L1} \leq d_{L1} \leq \lambda/n_{L1}$.

15. The dual-stack optical data storage medium as claimed in claim 12, wherein a transparent auxiliary layer I4, having a refractive index $n_{I4}$ and having a thickness $d_{I4}$ in the range of $0 < d_{I4} \leq 3\lambda/16n_{I4}$, is present between the write-once first recording layer and the second metal reflective layer.

16. The dual-stack optical data storage medium as claimed in claim 13, wherein a further transparent auxiliary layer I4, having a refractive index $n_{I4}$ and having a thickness $d_{I4}$ in the range of $0 < d_{I4} \leq 3\lambda/16n_{I4}$, is present between the write-once first recording layer and the second metal reflective layer.

17. The dual-stack optical data storage medium as claimed in claim 14, wherein a further transparent auxiliary layer I5, having a refractive index $n_{I5}$ and having a thickness $d_{I5}$ in the range of $0 < d_{I5} \leq 3\lambda/16n_{I5}$, is present adjacent the third metal reflective layer at a side of the third metal reflective layer closest to the entrance face.

18. The dual-stack optical data storage medium as claimed in claim 5, wherein at least one of the transparent auxiliary layer comprises a transparent heatsink material selected from the group of materials ITO, HfN and AlON.

19. The dual-stack optical data storage medium as claimed in claim 1, wherein a guide groove for write-once type second recording layer is provided in the transparent spacer layer.

20. The dual stack optical data storage medium as claimed in claim 1, wherein a guide groove (G) for write-once type first recording layer is provided in the substrate.

* * * * *